United States Patent Office 2,808,445
Patented Oct. 1, 1957

2,808,445
VULCANIZATION OF RUBBER AND PRODUCT OBTAINED THEREBY

John J. D'Amico, Charleston, W. Va., assignor to Monsanto Chemical Company, St. Louis, Mo., a corporation of Delaware No Drawing. Application September 17, 1953,
Serial No. 380,874

16 Claims. (Cl. 260—785)

This invention relates to a new class of thiazolesulfenamides which new class of compounds is characterized by strong catalytic activity for accelerating the vulcanization of sulfur-vulcanizable rubbers.

In accordance with this invention it has been found that thiazolesulfenamides of the structural formula

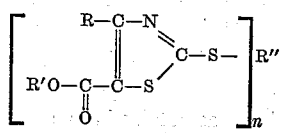

where $n$ is a whole number, where R and R' are hydrogen or hydrocarbon radicals and where R" is a primary amine residue or a 6-membered heterocyclic secondary amine residue containing a hetero nitrogen atom attached to the sulfur atom, are a class of highly useful vulcanization accelerators for sulfur-vulcanizable rubbers.

The monothiazolyl compounds falling within the scope of this invention are those of the aforedescribed formula wherein $n$ is one. Typical examples of this group are those wherein R" is a primary amine residue of the structure

where A is methyl, ethyl, n-propyl, isopropyl, n-butyl, sec-butyl, isobutyl, tert-butyl, n-amyl, isoamyl, sec-amyl, n-hexyl, 2-ethylhexyl, cyclohexyl, α-methylcyclohexyl, α-ethylcyclohexyl, furfuryl, tetrahydrofurfuryl, benzyl, β-phenethyl, 2-hydroxyethyl, 3-hydroxy-n-propyl, hydroxy-tert-butyl, and the like. Of this group the thiazolesulfenamides wherein A is a branched chain alkyl radical, especially one having a tertiary carbon linked to the nitrogen, e. g. tert-butyl, are preferred.

A particularly valuable group of compounds within the new class of thiazolesulfenamides are those in which R" is a 6-membered heterocyclic secondary amine residue such as morpholinyl, piperidyl, α-methyl piperidyl, γ-methyl piperidyl, and like heterocyclic secondary amine residues. Also included in this valuable group are the bis-thiazolyl sulfenamides of piperazine and the various alkyl substituted piperazines such as 2,5-dimethyl-piperazine. The piperazine derivatives may be represented as follows:

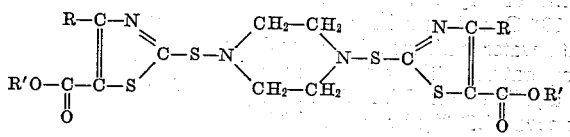

Other bis-thiazolyl sulfenamides falling within the scope of the present invention are those of the aforedescribed formula wherein $n$ is two and wherein R" is

as for example

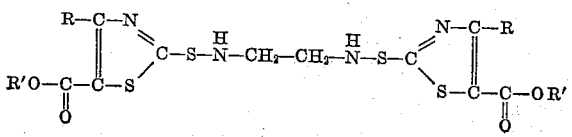

In general it is preferred that R and R' in the foregoing formulae be a short chain alkyl radical such as methyl, ethyl, propyl, and butyl, but it is to be understood that higher alkyl radicals such as amyl, hexyl, octyl, etc., as well as alicyclic radicals such as cyclohexyl, aralkyl radicals such as benzyl, phenethyl, and aryl radicals such as phenyl, tolyl, xylyl, and the like are also suitable. It is particularly preferred that R and R' be methyl or ethyl radicals.

The new thiazolesulfenamides of this invention may be prepared from the corresponding mercaptothiazole and appropriate amine by condensing these reactants in the presence of an oxidizing agent, as for example chlorine, hypochlorite, hydrogen peroxide and ammonium persulfate.

As illustrative of the new thiazolesulfenamides and the preparation thereof is the following:

EXAMPLE 1

*4-methyl-2(4-morpholinylsulfenyl)-5-thiazolecarboxylic acid*

An aqueous solution containing 43.8 grams (0.25 mole) of 2-mercapto-4-methyl-5-thiazolecarboxylic acid (Beil., 4th edition, vol. 27, p. 339), 170 grams of water, and 40.0 grams (0.25 mole) of a 25% aqueous sodium hydroxide solution was prepared in a one liter narrow beaker equipped with a mechanical mixer, dropping funnel, ice bath, and thermometer. To this solution at 15° C., 65.5 grams (0.75 mole) of morpholine was added at such a rate that the reaction did not exceed a temperature of 27° C. The mixture was cooled to 13° C. and 42 ml. of 25% sulfuric acid was added dropwise at 13–15° C. in 20 minutes. To this mixture at 13–20° C. there was added, drop by drop, with stirring over a period of 2 hours, 180 ml. (15.0 g./100 ml.) of sodium hypochlorite solution. The excess sodium hypochlorite was destroyed by the addition of one gram of sodium sulfite. The reaction mixture was cooled to 10° C., extracted with 500 ml. of ethyl ether, the ether extract washed with water until the washings were neutral to litmus, dried over sodium sulfate, and finally the ether removed in vacuo. The residue was a white solid, M. P. 56–57° C. Analysis gave 10.34% nitrogen and 24.75% sulfur as compared to 10.76% nitrogen and 24.63% sulfur calculated for $C_9H_{12}N_2O_3S_2$.

EXAMPLE 2

*4-(5-carbethoxy-4-methyl-2 - thiazolylsulfenyl)morpholine*

An aqueous solution containing 24.4 grams (0.12 mole) of 5-carbethoxy-4-methyl-2-thiazolethiol (Levi, Gazz. Chem. Ital. 61, p. 723—1931), 9.6 grams (0.24 mole) of sodium hydroxide in 200 ml. of water, and 104.5 grams (1.2 moles) of morpholine was prepared in a two liter beaker equipped with a mechanical mixer, dropping funnel, and a thermometer. To this solution at 25° C., there was added, drop by drop, with stirring over a period of two and one-half hours, 30.6 grams of iodine dissolved in 400 ml. of water containing 40 grams of potassium iodide. After about one-tenth of the iodine solution had been added, the sulfenamide began to separate in the form of white crystals. The product was filtered off, washed with water until free from alkali, and air dried at room temperature. The product, a white solid, M. P. 53–54° C., was obtained in 66% yield.

The yield was somewhat better by the following procedure:

Heptane (1200 ml.) and 39 grams (0.0964 mole) of 2,2' - dithio - bis - (5-carbethoxy-4-methyl thiazole) were charged in a two liter, three-necked flask, equipped with a thermometer, condenser, mechanical stirrer, and a Glas-Col mantle. The mixture was heated to 50° C. and 19.2 grams (0.22 mole) of morpholine was added to this solution. The reaction mixture was heated at 50° C. for one hour. After cooling to 25° C., the morpholine salt of the mercaptothiazole was recovered by filtration. The filtrate was extracted with 500 ml. of 2% aqueous sodium hydroxide, then washed with water until the washings were neutral to litmus, and the heptane was removed in vacuo at 35–40° C. The residue was cooled to 10° C., and the precipitate filtered off, washed with water, and air dried at 25° C. The product, a white solid, M. P. 53–54° C., was obtained in 76% yield. Analysis gave 9.70% nitrogen and 22.49% sulfur as compared to 9.71% nitrogen and 22.23% sulfur calculated for $C_{11}H_{16}N_2O_3S_2$.

EXAMPLE 3

4-(5-carbomethoxy-4-methyl-2-thiazolylsulfenyl) morpholine

An aqueous solution containing 45.2 grams (0.24 mole) of 5-carbomethoxy-4-methyl-2-thiazolethiol, 77 grams of 25% aqueous sodium hydroxide in 250 ml. of water and 209.5 grams (2.4 moles) of morpholine was prepared in a two liter beaker equipped with a mechanical mixer, dropping funnel and thermometer. To this solution at 25° C. there was added, drop by drop, with stirring over a period of 75 minutes, 61.2 grams of iodine dissolved in 800 ml. of water containing 80 grams of potassium iodide. After a small proportion of the iodine solution had been added the sulfenamide began to separate in the form of white crystals. The product was filtered off, washed with water until free from alkali and air dried at room temperature. A white solid, M. P. 123–124° C., was obtained in 38% yield.

Oxidation with sodium hypochlorite as follows gave better results: An aqueous slurry was prepared containing 50 grams (0.26 mole) of 5-carbomethoxy-4-methyl-2-thiazolethiol, 150 grams of water, and 24.8 grams (0.29 mole) of morpholine in a one liter narrow beaker equipped with a thermometer, mechanical mixer, dropping funnel, and hot water bath. To this mixture, at 50–52° C., there was added, drop by drop with stirring in 50 minutes, 160 ml. (14.6 g./100 ml.) of sodium hypochlorite. After cooling to 10° C., the precipitate was filtered off, washed with water until the washings were neutral to litmus, and air dried at room temperature. The product, a white solid, was obtained in 78.5% yield. After recrystallization from ethyl alcohol, it melted at 123–124° C. Analysis gave 10.00% nitrogen and 23.50% sulfur as compared to 10.21% nitrogen and 23.38% sulfur calculated for $C_{10}H_{14}N_2O_3S_2$.

Employing the second procedure of Example 3 but replacing morpholine with an equimolecular proportion of piperidine there is obtained 5-carbomethoxy-N-piperidyl-4-methyl-2-thiazolesulfenamide.

Employing the second procedure of Example 3 but replacing morpholine with an equimolecular proportion of piperazine there is obtained 1,4-bis-(5-carbomethoxy-4-methyl-2-thiazolylsulfenyl)piperazine.

EXAMPLE 4

4-(5-carbobutoxy-4-methyl-2-thiazolylsulfenyl) morpholine

An aqueous solution containing 115.5 grams (0.5 mole) of 5-carbobutoxy-4-methyl-2-thiazolethiol, 160 grams of 25% aqueous sodium hydroxide and 436 grams (5.0 moles) of morpholine in 2000 ml. of water was prepared and charged into a suitable reactor fitted with a mechanical mixer, dropping funnel and thermometer. To this solution at 25° C. there was gradually added with stirring 128 grams of iodine in 1700 ml. of water containing 138 grams of potassium iodide. About four hours was consumed in the addition of this solution and stirring was continued for another half hour and the reaction mixture cooled to 10° C., the solids filtered off and washed until the washings were neutral to litmus. The semi-solid product was dried at room temperature. The yield was 66 grams or 41.7% of theory.

EXAMPLE 5

5-carbomethoxy-N-cyclohexyl-4-methyl-2-thiazolesulfenamide

An aqueous solution containing 45.4 grams (0.24 mole) of 5-carbomethoxy-4-methyl-2-thiazolethiol, 77 grams of 25% aqueous sodium hydroxide in 200 ml. of water, and 237.6 grams (2.4 moles) of cyclohexylamine was prepared in a two liter beaker equipped with a mechanical mixer, dropping funnel, and a thermometer. To this solution at 25° C., there was added, drop by drop, with stirring over a period of two hours, 91.7 grams of iodine dissolved in 1200 ml. of water containing 120 grams of potassium iodide. After about one-tenth of the iodine solution had been added, the sulfenamide began to separate in the form of white crystals. The reaction mixture was extracted with 700 ml. of ethyl ether, the ether solution washed with water until free from alkali and the ether removed in vacuo. The residue was diluted with water and the solid removed by filtration and dried at room temperature. 45 grams representing a yield of 65.5% of theoretical was obtained as a cream solid, M. P. 55–57° C. Analysis gave 9.89% nitrogen and 22.62% sulfur as compared to 9.78% nitrogen and 22.39% sulfur calculated for $C_{12}H_{18}N_2O_2S_2$.

EXAMPLE 6

5-carbobutoxy-N-cyclohexyl-4-methyl-2-thiazolesulfenamide

The charge and procedure was similar to that described in Example 4 except that 495 grams of cyclohexylamine (5.0 moles) was substituted for the morpholine. After the addition of the iodine-potassium iodide, the liquid product which separated was removed by extraction with ether and the ether extracts washed until neutral and dried over sodium sulfate. The ether was then removed in vacuo, leaving the desired product as the residue. The crude reaction product was a dark oil obtained in a yield of 105 grams or 63.9%.

EXAMPLE 7

5-carbomethoxy-N-isopropyl-4-methyl-2-thiazolesulfenamide

An aqueous solution containing 45.4 grams (0.24 mole) of 5-carbomethoxy-4-methyl-2-thiazolethiol, 77 grams of 25% aqueous sodium hydroxide in 200 ml. of water, and 141.8 grams (2.4 moles) of monoisopropylamine was prepared in a two liter beaker equipped with a mechanical mixer, dropping funnel, and a thermometer. To this solution at 25° C., there was added, drop by drop, with stirring over a period of two hours, 91.7 grams of iodine dissolved in 1200 ml. of water containing 120 grams of potassium iodide. After about one-tenth of the iodine solution had been added, the sulfenamide began to separate in the form of crystals. The reaction mixture was cooled to 10° C. and the solid then removed by filtration, washed with water until free from alkali and air dried at room temperature. 29 grams representing a yield of 49.1% of a yellow solid, M. P. 57–58° C., was obtained. Analysis gave 11.50% nitrogen and 25.78% sulfur as compared to 11.37% nitrogen and 26.03% sulfur calculated for $C_9H_{14}N_2O_2S_2$.

Employing the procedure of Example 7 but replacing monoisopropylamine with an equimolecular proportion of n-propylamine 5-carbomethoxy-N-n-propyl-4-methyl-2-thiazolesulfenamide is obtained.

EXAMPLE 8

5-carbethoxy-N-isopropyl-4-methyl-2-thiazolesulfenamide

An aqueous solution containing 48.8 grams (0.24 moles) of 5-carbethoxy-4-methyl-2-thiazolethiol, 77 grams of 25% aqueous sodium hydroxide in 200 ml. of water and 141.8 grams (2.4 moles) of monoisopropylamine was prepared in a two liter beaker equipped with a mechanical mixer, dropping funnel and a thermometer. To this solution at 25° C. there was added, drop by drop, with stirring over a period of two hours, 91.7 grams of iodine in 1200 ml. of water containing 120 grams of potassium iodide. The reaction mixture was extracted with 700 ml. of ether and the ether solution washed with water until free from alkali and the ether removed in vacuo. The residue was a dark amber oil obtained in a yield of 48% theoretical. Analysis gave 24.10% sulfur as compared to 24.63% sulfur calculated for $C_{10}H_{16}N_2O_2S_2$.

EXAMPLE 9

5-carbomethoxy-N-tert-butyl-4-methyl-2-thiazolesulfenamide

An aqueous solution containing 48.3 grams (0.25 mole) of 5-carbomethoxy-4-methyl-2-thiazolethiol, 80 grams (0.5 mole) of 25% aqueous sodium hydroxide in 1000 ml. of water, and 182 grams (2.5 moles) of tert-butylamine was prepared in a suitable reaction vessel equipped with a mechanical mixer, dropping funnel, and a thermometer. To this solution was added drop by drop with agitation over a period of about two hours 64 grams of iodine dissolved in 850 ml. of water containing 69 grams of potassium iodide. The reaction mix was then stirred for an additional 30 minutes and then cooled to about 10° C. The reaction mix was then filtered and the filter cake washed with water until free from alkali, and then dried at room temperature. 16 grams of the product was obtained as a cream colored solid melting at 144° C. Analysis gave 10.46% nitrogen as compared to 10.75% nitrogen calculated for $C_{10}H_{16}N_2O_2S_2$.

Employing the procedure of Example 9 but replacing tert-butylamine with an equimolecular proportion of isobutylamine 5-carbomethoxy-N-isobutyl-4-methyl-2-thiazolesulfenamide is obtained.

EXAMPLE 10

5-carbethoxy-N-tert-butyl-4-methyl-2-thiazolesulfenamide

An aqueous solution containing 48.8 grams (0.24 mole) of 5-carbethoxy-4-methyl-2-thiazolethiol, 77 grams (0.48 mole) of 25% aqueous sodium hydroxide in 200 ml. of water, and 175.2 grams (2.4 moles) of tert-butylamine was prepared in a suitable reaction vessel equipped with a mechanical mixer, dropping funnel, and a thermometer. To this solution was added drop by drop with agitation over a period of about one hour 91.7 grams of iodine dissolved in 1200 ml. of water containing 120 grams of potassium iodide. The reaction mix was then filtered and the filter cake washed with water until free from alkali, and then dried at room temperature. 37 grams of the product was obtained as a cream colored solid melting at 92–93° C. Analysis gave 10.33% nitrogen and 23.43% sulfur as compared to 10.21% nitrogen and 23.39% sulfur calculated for $C_{11}H_{18}N_2O_2S_2$.

EXAMPLE 11

5-carbobutoxy-N-tert-butyl-4-methyl-2-thiazolesulfenamide

An aqueous solution containing 55.5 grams (0.24 mole) of 5-carbobutoxy-4-methyl-2-thiazolethiol, 80 grams (0.5 mole) of 25% aqueous sodium hydroxide in 200 ml. of water, and 175.2 grams (0.24 mole) of tert-butylamine was prepared in a suitable reaction vessel equipped with a mechanical mixer, dropping funnel, and a thermometer. To this solution was added drop by drop with agitation over a period of about one hour 91.7 grams of iodine dissolved in 1200 ml. of water containing 120 grams of potassium iodide. The reaction was cooled to about 10° C. and then extracted with 500 ml. of diethyl ether. The ether solution was then washed free of alkali with water and the so treated solution dried and then the ether was removed in vacuo. The product, a tan colored solid, melting at 45–47° C., was obtained in 70.1% yield. Analysis gave 21.34% sulfur as compared to 21.20% sulfur calculated for $C_{13}H_{22}N_2O_2S_2$.

EXAMPLE 12

5-carbomethoxy-N-(hydroxy-tert-butyl)-4-methyl-2-thiazolesulfenamide

To an agitated solution containing 47.3 grams (0.25 mole) of 5-carbomethoxy-4-methyl-2-thiazolethiol, 200 ml. of water, 80 grams (0.25 mole) of 25% aqueous sodium hydroxide and 222.9 grams (2.5 moles) of 2-amino-2-methyl-1-propanol was added drop by drop over a period of one hour 91.7 grams of iodine dissolved in 1200 ml. of water containing 120 grams of potassium iodide. The mix was stirred for an additional 30 minutes, cooled to 10° C. and extracted with 500 ml. of diethyl ether. The ether extract was washed with water to remove the alkali, dried, and then the ether was removed in vacuo. The product melting at 108–110° C. was obtained in a 29% yield. Upon recrystallizing from heptane, it melted at 116–118° C. Analysis gave 9.72% nitrogen and 23.00% sulfur as compared to 10.13% nitrogen and 23.70% sulfur calculated for $C_{10}H_{16}N_2O_3S_2$.

EXAMPLE 13

5-carbethoxy-N-(hydroxy-tert-butyl)-4-methyl-2-thiazolesulfenamide

To an agitated solution containing 50.9 grams (0.25 mole) of 5-carbethoxy-4-methyl-2-thiazolethiol, 200 ml. of water, 80 grams (0.25 mole) of 25% aqueous sodium hydroxide and 222.9 grams (2.5 moles) of 2-amino-2-methyl-1-propanol was added drop by drop over a period of one and one-half hours 91.7 grams of iodine dissolved in 1200 ml. of water containing 120 grams of potassium iodide. The reaction mix was stirred for an additional two hours and then filtered. The filter cake was then washed free of alkali and dried at room temperature. The product melting at 97–98° C. was obtained in a 34.4% yield. Analysis gave 9.41% nitrogen and 22.10% sulfur as compared to 9.64% nitrogen and 22.08% sulfur calculated for $C_{11}H_{18}N_2O_3S_2$.

EXAMPLE 14

5-carbobutoxy-N-(hydroxy-tert-butyl)-4-methyl-2-thiazolesulfenamide

To an agitated solution containing 48 grams (0.208 mole) of 5-carbobutoxy-4-methyl-2-thiazolethiol, 200 ml. of water, 66.5 grams of 25 aqueous sodium hydroxide and 185.6 grams (2.08 moles) of 2-amino-2-methyl-1-propanol was added drop by drop over a period of one and one-half hours 76.5 grams of iodine dissolved in 1000 ml. of water containing 100 grams of potassium iodide. The reaction mix was stirred for an additional one and one-half hours, cooled to 10° C. and filtered. The filter cake was then washed free of alkali and dried at room temperature. The product melting at 68–70° C. was obtained in a 56% yield. Analysis gave 20.36% sulfur as compared to 20.14% sulfur calculated for $C_{13}H_{22}N_2O_3S_2$.

The new thiazolesulfenamides are characterized by strong catalytic activity for accelerating the vulcanization of sulfur-vulcanizable rubbers both natural and synthetic. In general the new thiazolesulfenamides provide a degree of processing safety unattainable with accelerators heretofore available. This is particularly true with respect to the new thiazolesulfenamides wherein R″ of the aforedescribed structural formula is a 6-membered heterocyclic secondary amine residue containing not more than two hetero atoms, one of which being nitrogen, and at least four carbon atoms in the ring and consisting of carbon and hydrogen atoms in addition to the hetero atom (or atoms).

The powerful accelerating properties as well as the marked delayed action of the group of new thiazolesulfenamides wherein R" is a 6-membered heterocyclic secondary amine residue is illustrated by comparison to the commercial delayed action accelerator N-cyclohexyl 2-benzothiazolesulfenamide in a stock containing furnace carbon black. The inclusion of furnace type carbon black is significant because these blacks do not possess the retarding properties inherent with channel black so that stocks compounded with furnace black tend to cure during processing.

Rubber stocks were compounded comprising:

| Stock | A | B |
|---|---|---|
| | Parts by weight | |
| Smoked sheets rubber | 100 | 100 |
| Furnace carbon black | 50 | 50 |
| Zinc oxide | 5 | 5 |
| Saturated hydrocarbon softener | 10 | 10 |
| Stearic acid | 2 | 2 |
| Condensation product of p-amino biphenyl and acetone | 1.5 | 1.5 |
| N-Cyclohexyl 2-benzothiazolesulfenamide | 0.8 | |
| 4-(5-Carbethoxy-4-methyl-2-thiazolyl-sulfenyl) morpholine | | 0.8 |

The stocks so compounded were cured in the usual manner by heating in a press for 30 minutes at 144° C. The physical properties of the vulcanizates illustrate the powerful accelerating action of the new compounds.

TABLE I

| Stock | Modulus of Elasticity in lbs./in.² at Elongation of 300% | Tensile at Break in lbs./in.² | Ultimate Elongation, percent |
|---|---|---|---|
| A | 2,720 | 4,033 | 446 |
| B | 2,620 | 4,025 | 450 |

In addition the processing safety of the vulcanizable compositions was evaluated by means of a Mooney plastometer at 121° C. The time to prevulcanize or scorch is taken as the time in minutes at which the plasticity curve begins to rise continuously and sharply.

TABLE II

| Stock | Mooney Scorch in mins. at 121° C. |
|---|---|
| A | 11 |
| B | 12 |

Several 5-carbalkoxy N,N-dialkyl-2-thiazolesulfenamides have also been prepared and characterized but not one of them provided an element of processing safety comparable to the thiazolesulfenamides of this invention wherein R" of the aforedescribed structural formula is a heterocyclic secondary amine residue. In similar rubber formulations 5 - carbethoxy - N,N - diethyl - 4 - methyl-2-thiazolesulfenamide, an amber oil; and 5-carbomethoxy-N,N-diethyl-4-methyl-2-thiazolesulfenamide, a yellow solid, M. P. 39° C. (nitrogen 11.00%, sulfur 24.49% as compared to nitrogen 10.76% and sulfur 24.63% calculated for C₁₀H₁₆N₂O₂S₂) were greatly inferior to 4-(5-carbethoxy-4-methyl-2-thiazolylsulfenyl)morpholine. The Mooney scorch times at 121° C. were in each instance for the 5-carbalkoxy-N,N-dialkyl-2-thiazolesulfenamides only about one-half that of the commercial delayed action accelerator N-cyclohexyl-2-benzothiazolesulfenamide. Additionally 5-carbomethoxy-N,N-di-isopropyl-4-methyl-2-thiazolesulfenamide, an amber oil (nitrogen 9.47% and sulfur 22.84% as compared to 9.71% nitrogen and 22.23% sulfur calculated for C₁₂H₂₀N₂O₂S₂) was prepared and evaluated in a rubber formulation and found to exhibit less delayed action than that employing N-cyclohexyl-2-benzothiazolesulfenamide as the vulcanization accelerator.

As an example of delayed action in a gum stock, again as compared to the same commercial delayed action accelerator, rubber stocks were compounded comprising:

| Stock | C | D |
|---|---|---|
| | Parts by weight | |
| Smoked sheets rubber | 100 | 100 |
| Zinc oxide | 5 | 5 |
| Stearic acid | 1 | 1 |
| Sulfur | 3 | 3 |
| N-Cyclohexyl 2-benzothiazolesulfenamide | 1 | |
| 4-Methyl-2(4-morpholinylsulfenyl)-5-thiazolecarboxylic acid | | 1 |

The stocks so compounded were cured in the usual manner by heating in a press for 30 and 60 minutes at 135° C. It will be noted from the cure results that the delayed action of the carboxyl substituted sulfenamide was so great that no cure at all was obtained in 30 minutes although the 60 minute cure shows accelerating strength comparable to the commercial control.

TABLE III

| Stock | Cure Time in Mins. | Modulus of Elasticity in lbs./in.² at Elongation of 500% | Tensile at Break in lbs./in.² | Ultimate Elongation, percent |
|---|---|---|---|---|
| C | 30 | 1,540 | 4,165 | 670 |
| D | 30 | no cure | | |
| C | 60 | 1,670 | 4,165 | 660 |
| D | 60 | 1,605 | 3,700 | 665 |

In addition the processing safety was evaluated using the Mooney plastometer in the manner described. The stock containing the carboxyl substituted sulfenamide showed no evidence of scorch for the duration of the test.

TABLE IV

| Stock | Mooney scorch in mins. at 135° C. |
|---|---|
| C | 21 |
| D | 30+ |

As still further examples of accelerating activity and processing safety in the presence of furnace carbon black, rubber stocks were compounded comprising:

| Stock | E | F | G | H |
|---|---|---|---|---|
| | Parts by weight | | | |
| Pale crepe rubber | 100 | 100 | 100 | 100 |
| Furnace carbon black | 50 | 50 | 50 | 50 |
| Zinc oxide | 5 | 5 | 5 | 5 |
| Saturated hydrocarbon softener | 3 | 3 | 3 | 3 |
| Stearic acid | 2 | 2 | 2 | 2 |
| Sulfur | 2.5 | 2.5 | 2.5 | 2.5 |
| Condensation product of p-amino biphenyl and acetone | 1.5 | 1.5 | 1.5 | 1.5 |
| N-Cyclohexyl 2-benzothiazolesulfenamide | 0.8 | | | |
| 4-(5-Carbomethoxy-4-methyl-2-thiazolyl-sulfenyl)morpholine | | 0.8 | | |
| 4-(5-Carbethoxy-4-methyl-2-thiazolylsulfenyl)morpholine | | | 0.8 | |
| 4-Methyl-2(4-morpholinylsulfenyl)-5-thiazolecarboxylic acid | | | | 0.8 |

The stocks so compounded were cured in the usual manner by heating in a press for 30 minutes at 144° C. The accelerating activity was comparable to that of the commercial control in every case. The data are set forth below:

TABLE V

| Stock | Modulus of Elasticity in lbs./in.² at Elongation of 300% | Tensile at Break in lbs./in.² | Ultimate Elongation, percent |
|---|---|---|---|
| E | 2,910 | 4,200 | 455 |
| F | 3,083 | 4,130 | 426 |
| G | 3,056 | 4,213 | 436 |
| H | 2,850 | 4,125 | 430 |

Again the time required for prevulcanization was evaluated by the Mooney plastometer in the manner above-described. It will be noted that all of the accelerators are of the delayed action type.

TABLE VI

| Stock | Mooney Scorch in mins. at 135° C. |
|---|---|
| E | 5 |
| F | 5 |
| G | 6 |
| H | 5 |

Similar tests were carried out with formulations comprising:

| Stock | J | K | L |
|---|---|---|---|
| | Parts by weight | | |
| Pale crepe rubber | 100 | 100 | 100 |
| Furnace carbon black | 50 | 50 | 50 |
| Zinc oxide | 5 | 5 | 5 |
| Stearic acid | 2 | 2 | 2 |
| Saturated hydrocarbon softener | 3 | 3 | 3 |
| Sulfur | 2.5 | 2.5 | 2.5 |
| N-Cyclohexyl 2-benzothiazolesulfenamide | 0.8 | | |
| 5-Carbomethoxy-N-cyclohexyl-4-methyl-2-thiazolesulfenamide | | 0.8 | |
| 5-Carbomethoxy-N-isopropyl-4-methyl-2-thiazolesulfenamide | | | 0.8 |

The stocks so compounded were cured by heating in a press for 30 minutes at 144° C. Additionally the scorch time was determined at 121° C. employing the Mooney plastometer as described.

TABLE VII

| Stock | Modulus of Elasticity in lbs./in.² at Elongation of 300% | Tensile at Break in lbs./in.² | Ult. Elong., percent | Mooney Scorch in mins. at 121° C. |
|---|---|---|---|---|
| J | 2,893 | 3,906 | 406 | 9 |
| K | 2,740 | 3,600 | 400 | 8 |
| L | 2,930 | 3,466 | 366 | 10 |

Replacing the accelerator by 5-carbomethoxy-N,N-diethyl-4-methyl-2-thiazolesulfenamide in the foregoing formulation resulted in a compound having inadequate processing safety.

As illustrative of the properties in a synthetic rubber stock compositions were compounded comprising:

| Stock | M | N | O | P |
|---|---|---|---|---|
| | Parts by weight | | | |
| GR-S-100 | 100 | 100 | 100 | 100 |
| Furnace carbon black | 50 | 50 | 50 | 50 |
| Saturated hydrocarbon softener | 10 | 10 | 10 | 10 |
| Zinc oxide | 4 | 4 | 4 | 4 |
| Stearic acid | 2 | 2 | 2 | 2 |
| Sulfur | 1.75 | 1.75 | 1.75 | 1.75 |
| N-Cyclohexyl 2-benzothiazolesulfenamide | 1.2 | | | |
| 4-(5-Carbethoxy-4-methyl-2-thiazolylsulfenyl) morpholine | | 1.2 | | |
| 4-(5-Carbomethoxy-4-methyl-2-thiazolylsulfenyl) morpholine | | | 1.2 | |
| 5-Carbomethoxy-N-isopropyl-4-methyl-2-thiazolesulfenamide | | | | 1.2 |

The stocks so compounded were cured by heating in a press at 144° C.

TABLE VIII

| Stock | Cure Time in Mins. | Modulus of Elasticity in lbs./in.² at Elongation of 300% | Tensile at Break in lbs./in.² | Ultimate Elongation, percent |
|---|---|---|---|---|
| M | 60 | 1,660 | 3,196 | 543 |
| N | 60 | 1,745 | 3,235 | 500 |
| O | 60 | 1,843 | 3,270 | 535 |
| P | 60 | 2,030 | 3,370 | 470 |
| M | 90 | 1,780 | 3,350 | 530 |
| N | 90 | 1,960 | 3,365 | 520 |
| O | 90 | 1,935 | 3,325 | 490 |
| P | 90 | 2,070 | 3,100 | 445 |

The processing safety was evaluated at 135° C. employing the Mooney plastometer as described.

TABLE IX

| Stock | Mooney Scorch in mins. at 135° C. |
|---|---|
| M | 26 |
| N | 30 |
| O | 28 |
| P | 26 |

The new sulfenamides show marked acceleration in butyl rubber although the order of activity is not necessarily the same as in natural rubber. The following compositions were cured by heating in a press for different periods of time at 165.5° C. p-Quinone dioxime is a well-known accelerator and vulcanizing agent especially recommended for this polymer.

| Stock | Q | R | S |
|---|---|---|---|
| | Parts by weight | | |
| Butyl rubber | 100 | 100 | 100 |
| Carbon black | 50 | 50 | 50 |
| Zinc oxide | 5 | 5 | 5 |
| Stearic acid | 1 | 1 | 1 |
| Sulfur | 1.5 | 1.5 | 1.5 |
| Lead dioxide | 10 | 10 | 10 |
| p-Quinone dioxime | 6 | | |
| 4-(5-Carbomethoxy-4-methyl-2-thiazolylsulfenyl)morpholine | | 6 | |
| 5-Carbethoxy-N-isopropyl-4-methyl-2-thiazolesulfenamide | | | 1 |
| Mercaptobenzothiazole | | | 0.5 |

TABLE X

| Stock | Cure Time in Mins. | Modulus of Elasticity in lbs./in.² at Elongation of 500% | Tensile at Break in lbs./in.² | Ultimate Elongation, percent |
|---|---|---|---|---|
| Q | 60 | | 1,323 | 213 |
| R | 60 | 736 | 1,620 | 826 |
| S | 60 | 1,420 | 1,750 | 700 |
| Q | 90 | | 1,296 | 220 |
| R | 90 | 823 | 1,686 | 776 |
| S | 90 | 1,480 | 1,660 | 610 |

It is of interest that replacement of 4-(5-carbomethoxy-4-methyl-2-thiazolylsulfenyl)morpholine by the same amount of 4-(5-carbethoxy-4-methyl-2-thiazolylsulfenyl)morpholine resulted in weak accelerating action, the modulus and tensile strength of the vulcanizates being no more than half those shown above although the compounds are comparable in other type polymers. The stock containing p-quinone dioxime cured during the preheating period before any readings could be recorded on the Mooney plastometer. Stock R showed no evidence of cure after 30 minutes at 135° C. and the scorch time of Stock S was 8 minutes.

Further examples of the new sulfenamides were evaluated in natural rubber compositions and were found to exhibit marked delayed action. However, at curing temperature they exhibited fast accelerating action. Compositions were compounded comprising:

| Stock | T | U | V |
|---|---|---|---|
| | Parts by weight | | |
| Smoked sheets rubber | 100 | 100 | 100 |
| Furnace carbon black | 50 | 50 | 50 |
| Zinc oxide | 5 | 5 | 5 |
| Stearic acid | 2 | 2 | 2 |
| Saturated hydrocarbon softener | 3 | 3 | 3 |
| Sulfur | 2.5 | 2.5 | 2.5 |
| Reaction product of p-amino biphenyl and acetone | 1.5 | 1.5 | 1.5 |
| N-Cyclohexyl 2-benzothiazolesulfenamide | 0.8 | | |
| 4-(5-Carbobutoxy-4-methyl-2-thiazolylsulfenyl) morpholine | | 0.8 | |
| 5-Carbobutoxy-N-cyclohexyl-4-methyl-2-thiazolesulfenamide | | | 0.8 |

The stocks so compounded were cured in the usual manner by heating in a press for different periods of time at 142° C. The physical properties exhibited by the 15 minute cures are reproduced below and indicate that the compounds are fast powerful accelerators at curing temperature.

TABLE XI

| Stock | Modulus of Elasticity lbs./in.² at Elongation of 300% | Tensile at Break in lbs./in.² | Ultimate Elongation percent |
|---|---|---|---|
| T | 2,586 | 4,423 | 483 |
| U | 2,113 | 4,326 | 546 |
| V | 2,430 | 4,326 | 570 |

In spite of the activity at curing temperature, the compositions were relatively inactive at lower temperatures. Thus, the processing safety was evaluated by means of the Mooney plastometer as described.

TABLE XII

| Stock | Mooney Scorch in Mins. | |
|---|---|---|
| | at 121° C. | at 135° C. |
| T | 8 | 4 |
| U | 8 | 4 |
| V | 8 | 5 |

Additionally as illustrative of the vulcanization accelerating properties of the new thiazolesulfenamides of this invention rubber compositions were compounded comprising:

| Stock | W | X |
|---|---|---|
| | Parts by weight | |
| Smoked sheets rubber | 100 | 100 |
| Furnace carbon black | 50 | 50 |
| Zinc oxide | 5 | 5 |
| Stearic acid | 2 | 2 |
| Saturated hydrocarbon softener | 3 | 3 |
| Sulfur | 2.5 | 2.5 |
| N-Cyclohexyl-2-benzothiazolesulfenamide | 0.8 | |
| N-tert-Butyl-5-carbethoxy-4-methyl-2-thiazolesulfenamide | | 0.8 |

The stocks so compounded were cured in the usual manner by heating in a press for 15 minutes at 142° C. The physical properties obtained are set forth below:

TABLE XIII

| Stock | Modulus of Elasticity in lbs./in.² at Elongation of 300% | Tensile at Break in lbs./in.² | Ult. Elong., Percent | Mooney Scorch in mins. at 121° C. |
|---|---|---|---|---|
| W | 2,900 | 4,223 | 450 | 9 |
| X | 3,120 | 4,395 | 430 | 12 |

As still further illustrative of the vulcanization accelerating properties of the thiazolesulfenamides of this invention synthetic rubber stocks were compounded comprising:

| Stock | AA | BB | CC | DD |
|---|---|---|---|---|
| | Parts by weight | | | |
| Butadiene-styrene copolymer (GR-S-100) | 100 | 100 | 100 | 100 |
| Furnace carbon black | 50 | 50 | 50 | 50 |
| Zinc oxide | 4 | 4 | 4 | 4 |
| Saturated hydrocarbon softener | 10 | 10 | 10 | 10 |
| Stearic acid | 2 | 2 | 2 | 2 |
| Sulfur | 1.75 | 1.75 | 1.75 | 1.75 |
| N-Cyclohexyl 2-benzothiazolesulfenamide | 1.2 | | | |
| N-tert-Butyl-5-carbomethoxy-4-methyl-2-thiazolesulfenamide | | 1.2 | | |
| N-tert-Butyl-5-carbethoxy-4-methyl-2-thiazolesulfenamide | | | 1.2 | |
| N-(Hydroxy-tert-butyl)-5-carbethoxy-4-methyl-2-thiazolesulfenamide | | | | 1.2 |

The stocks so compounded were cured in the usual manner by heating in a press for 90 minutes at 144° C. The physical properties obtained are set forth below as well as the scorch times of the respective stocks as measured by the Mooney plastometer at 135° C.

TABLE XIV

| Stock | Modulus of Elasticity in lbs./in.² at Elongation of 300% | Tensile at Break in lbs./in.² | Ult. Elong., Percent | Mooney Scorch in mins. at 135° C. |
|---|---|---|---|---|
| AA | 1,820 | 3,690 | 590 | 28 |
| BB | 2,126 | 3,423 | 466 | 35 |
| CC | 2,023 | 3,595 | 500 | 36 |
| DD | 2,030 | 3,460 | 460 | 36 |

As further illustrative of the vulcanization accelerating properties of the thiazolesulfenamides of this invention natural rubber stocks were compounded comprising:

| Stock | EE | FF |
|---|---|---|
| | Parts by weight | |
| Smoked sheets rubber | 100 | 100 |
| Furnace carbon black | 50 | 50 |
| Zinc oxide | 5 | 5 |
| Stearic acid | 2 | 2 |
| Saturated hydrocarbon softener | 3 | 3 |
| Sulfur | 2.5 | 2.5 |
| N-Cyclohexyl 2-benzothiazolesulfenamide | 0.8 | |
| 5-Carbomethoxy-N-(hydroxy-tert-butyl)-4-methyl-2-thiazolesulfenamide | | 0.8 |

The stocks so compounded were cured in the usual manner by heating in a press for 15 minutes at 142° C. The physical properties obtained are set forth below:

TABLE XV

| Stock | Modulus of Elasticity in lbs./in.² at Elongation of 300% | Tensile at Break in lbs./in.² | Ultimate Elongation, percent |
|---|---|---|---|
| EE | 2,790 | 3,895 | 435 |
| FF | 2,585 | 3,835 | 450 |

The scorch times of stocks EE and FF as measured on the Mooney plastometer at 121° C. were found to be the same, namely 16 minutes.

The new sulfenamides form reaction products with dimethylolurea which are valuable accelerators. Similarly they form addition products with zinc chloride. The zinc chloride adducts possess accelerating activity comparable to the parent materials. Zinc chloride adducts are formed by associating a solution of zinc chloride with a solution of the sulfenamide. For example, admixing anhydrous ether solutions of 4-(5-carbomethoxy-4-methyl-2-thiazolylsulfenyl)morpholine and zinc chloride U. S. P. resulted in precipitation of the desired addition product. After standing 20 hours the solids were filtered off. The product melted at 95–100° C. Analysis indicated that a mole to mole addition product formed. The solid product obtained in similar manner from zinc chloride and 4 - (5 - carbethoxy-4-methyl-2-thiazolylsulfenyl) morpholine melted at 75–85° C. Again analysis indicated that a mole to mole addition product was formed.

By the term "sulfur-vulcanizable rubber" as employed in the specification and claims is meant to include natural as well as synthetic rubbers which are capable of vulcanization when heated with sulfur and is intended to include latices and reclaims thereof whether or not admixed with fillers, softeners, pigments, antioxidants, etc.

While this invention has been described with respect to certain embodiments it is not so limited and it is to be understood that various changes and modifications may be made without departing from the spirit or scope of this invention.

This case is a continuation-in-part of application Serial No. 294,929, filed June 21, 1952 now abandoned. A continuation-in-part of application Serial No. 294,929 matured as U. S. Patent 2,766,237.

What is claimed is:

1. The method of vulcanizing a sulfur-vulcanizable rubber which comprises heating a sulfur-vulcanizable rubber, sulfur and a thiazolesulfenamide of the structural formula

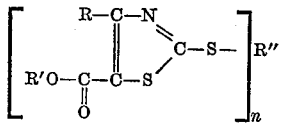

where $n$ is a whole number less than 3, where R and R' are selected from the group consisting of hydrogen and hydrocarbon radicals, and where R" is selected from the group consisting of primary amine residues and 6-membered heterocyclic secondary amine residues containing a hetero nitrogen atom attached to the sulfur atom.

2. The method of vulcanizing a sulfur-vulcanizable rubber which comprises heating a sulfur-vulcanizable rubber, sulfur and a thiazolesulfenamide of the structural formula

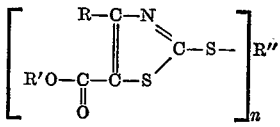

where $n$ is a whole number less than 3, where R and R' are short chain alkyl radicals, and where R" is a 6-membered heterocyclic secondary amine residue containing not more than two hetero atoms, one of which being a nitrogen atom which is attached to the sulfur atom, and containing at least four carbon atoms in the ring and consisting of carbon and hydrogen atoms in addition to the hetero atoms.

3. The method of vulcanizing a sulfur-vulcanizable rubber which comprises heating a sulfur-vulcanizable rubber, sulfur and a thiazolesulfenamide of the structural formula

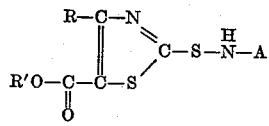

where R, R' and A are short chain alkyl radicals.

4. The method of vulcanizing a sulfur-vulcanizable rubber which comprises heating a sulfur-vulcanizable rubber, sulfur, furnace carbon black, and a thiazolesulfenamide of the structural formula

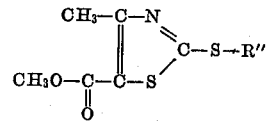

where R" is a 6-membered heterocyclic secondary amine residue containing not more than two hetero atoms, one of which being a nitrogen atom which is attached to the sulfur atom, and containing at least four carbon atoms in the ring and consisting of carbon and hydrogen atoms in addition to the hetero atoms.

5. The method of vulcanizing a sulfur-vulcanizable rubber which comprises heating a sulfur-vulcanizable rubber, sulfur, furnace carbon black, and a thiazolesulfenamide of the structural formula

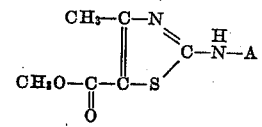

where A is a short chain alkyl radical.

6. The method of vulcanizing a sulfur-vulcanizable rubber which comprises heating natural rubber, sulfur and 4 - (5 - carbomethoxy-4-methyl-2-thiazolesulfenyl) morpholine.

7. The method of vulcanizing a sulfur-vulcanizable rubber which comprises heating natural rubber, sulfur and 4 - (5 - carbethoxy - 4 - methyl-2-thiazolesulfenyl) morpholine.

8. The method of vulcanizing a sulfur-vulcanizable rubber which comprises heating natural rubber, sulfur and 5 - carbomethoxy - N - cyclohexyl-4-methyl-2-thiazolesulfenamide.

9. The method of vulcanizing a sulfur-vulcanizable rubber which comprises heating natural rubber, sulfur and 5 - carbomethoxy - N - isopropyl - 4 - methyl-2-thiazolesulfenamide.

10. The method of vulcanizing a sulfur-vulcanizable rubber which comprises heating natural rubber, sulfur and 5 - carbethoxy - N - tert - butyl-4-methyl-2-thiazolesulfenamide.

11. The vulcanizate obtained by the process of claim 1.

12. The vulcanizate obtained by the process of claim 6.

13. The vulcanizate obtained by the process of claim 7.

14. The vulcanizate obtained by the process of claim 8.

15. The vulcanizate obtained by the process of claim 9.

16. The vulcanizate obtained by the process of claim 10.

References Cited in the file of this patent

UNITED STATES PATENTS 2,342,545    Jones _____ Feb. 22, 1944